US005333452A

United States Patent [19]

Dameron

[11] Patent Number: 5,333,452

[45] Date of Patent: Aug. 2, 1994

[54] SHAFT DRIVE HYDRAULIC SYSTEM AND ISOLATED HYDRAULIC SYSTEM

[76] Inventor: Tony Dameron, P.O. Box 7892, Gulfport, Miss. 39506

[21] Appl. No.: 937,978

[22] Filed: Aug. 31, 1992

[51] Int. Cl.[5] .............................................. F16D 31/02

[52] U.S. Cl. ...................................... 60/484; 180/6.58

[58] Field of Search ................. 60/420, 421, 428, 484, 60/486, 477; 91/514, 518; 180/6.2, 6.58, 6.6, 89.13, 326

[56] References Cited

U.S. PATENT DOCUMENTS 2,855,110 10/1958 Prichard ............................ 180/6.58
3,171,504 3/1965 Noll et al. .......................... 180/6.58
3,489,235 1/1970 Watson .............................. 180/6.58
4,055,046 10/1977 Schexnayder ........................ 60/428
4,177,869 12/1979 Crabiel .............................. 180/6.58
4,273,503 6/1981 Damron ............................. 60/477 X
4,394,886 7/1983 Rathje et al. .................. 180/6.58 X
4,415,050 11/1983 Nishida et al. ................ 180/6.58 X
4,467,604 8/1984 Forster ........................... 180/6.58 X

*Primary Examiner*—Edward K. Look
*Assistant Examiner*—Hoang Nguyen
*Attorney, Agent, or Firm*—Gregory M. Friedlander

[57] ABSTRACT

The present invention provides for two separate hydraulic systems ran from a single diesel engine wherein one of the hydraulic systems is in the raised platform and the second hydraulic system is on the lower platform rotatable relative to the raised platform.

24 Claims, 3 Drawing Sheets

SHAFT DRIVE HYDRAULIC SYSTEM AND ISOLATED HYDRAULIC SYSTEM

BACKGROUND OF THE INVENTION

This invention applies to hydraulic driven motors. More specifically this patent is an improvement on existing shaft driven hydraulic motors used on rotating platforms.

1. Field of Invention

The invention relates to hydraulic systems driven by motors.

More particularly, the present invention relates to having separate hydraulic systems driven by a single engine and being rotatable relative to one another.

2. Prior Art

The prior art shows a raised platform having a hydraulic system on the upper portion of the platform being driven by a diesel engine on the lower platform by way of a drive shaft for allowing the free rotation of the hydraulic system relative to the motor.

The present invention improves on that concept by providing for two separate hydraulic systems from a single diesel engine when one of the hydraulic systems is on the raised platform and the second hydraulic system is on the lower platform.

U.S. Pat. No. 4,273,503 issued to Dameron, shows a hydraulic pump driven by a drive shaft from a motor. The inventive concept lies in the fact that either the pump or motor is on a spinning platform. The spinning of the drive shaft prevents a problem from arising from one (the pump) spinning and the other (the engine) remaining relatively stationary. The hydraulic pump runs various hydraulic systems.

The current usage of hydraulic systems includes running power saws and other dirt and heat generating pieces of equipment from the hydraulic system in a skidder.

Running these systems off of an existing hydraulic system is an accepted practice, but these systems typically pollute the existing system with a high degree of dirt and heat. Existing systems also often times require one hydraulic system which would be more efficient running at a greater or lesser pressure than a separate system. Saws; for example, require that the system run at a higher pressure because of the high amounts of hydraulic fluid preferably used to run the saws.

Existing systems typically result in continuous operation of all hydraulics which degrades systems even though they otherwise have only intermittent functional operation.

Existing hydraulic systems failed to provide for these problems. It is undesirable to have dirt and heat introduced into the hydraulic system having the more expensive components.

Existing systems typically must draw on a limited hydraulic fluid supply and heat buildup is therefore too great.

Another problem in the existing prior art arises because the two hydraulic systems are operated from a single hydraulic motor. Since one of these systems may be mounted on a swivel relative to the other system a complicated plumbing arrangement is necessary in order to, allow the passage of hydraulic fluid in more than one direction and particularly to several hydraulic activating means.

As is obvious, the introduction of dirt into such a system, which by nature requires a series of gaskets can serve to degrade the system at a fast rate and also add to the unacceptable heat buildup in the system.

One of the reasons for desiring a larger hydraulic fuel well for the faster hydraulic system which would run, for example, chain saws, is in order to give the hydraulic fluid a chance to cool down. This cooling problem is exacerbated by the requirements of existing systems to run continuously.

Continuous running rather than intermittent operation of the secondary hydraulic system also exacerbates system degradation.

GENERAL DISCUSSION OF THE INVENTION

The invention comprises two separate hydraulic systems run from a single diesel or gasoline engine. One system sits above and rotates relative to the other system. The driving motor is preferably put on top. A hydraulic motor driven by pumps from the first top hydraulic system drives a second lower systems. A drive shaft centered at the axis of rotation allows for the second hydraulic system to operate while one hydraulic system spins relative to the other.

While in the prior art only the engine spun relative to the hydraulic system by way of a shaft, now two entirely separate hydraulic systems spin relative to each other by way of a shaft.

Additional improvements include the use of separate hydraulic reservoirs, separate operating valves, common placement of operational levers through the use of an electric rotating manifold to control the set of valves on the second hydraulic system.

The rotating manifold allows for electric currents to pass from top hydraulic system to bottom hydraulic system despite the spinning of the top relative to the bottom. The manifold is old in the art and is basically a series of concentric donut shaped circuits matching and in electrical contact with an identical set of concentric donut shaped circuits so that as the unit spins current can constantly pass between the donut shaped circuits. The current activates electric switches which in turn control valves which control the second hydraulic system. The first hydraulic system is controlled by levers on the first hydraulic system's valves which are pulled by a human hand, The human hand also throws the switches which control the electric currents which pass through the electric rotating manifold.

Other Improvements include: (1) Reduced heat in the top hydraulic system through intermittent as opposed to continuous running of the lower hydraulic system by use of cutoff systems of fluid to the hydraulic motor operating the lower hydraulic system (the bottom hydraulic system is only hotter because of the way it is used) (2) Allowing more oil to be run through one of the two systems by having the two systems operate at different speeds; (3) enhanced safety; (4) electric switch driven valves keeping remote hydraulic system fluids away from the operator; (5) reducing the risk of serious injury by decreasing the amount of heat and number of plumbing devices and connectors in proximity of the user and nearby workers; (6) allowing for the controls (valves) for both hydraulic systems to be closer to the pumps whose output they control; (7) allowing for the expensive top hydraulics to be separated from the less expensive bottom system.

It is a further object of the invention to provide for a hydraulic system wherein there are two separate hydraulic systems so that one hydraulic system may work at a different speed and use a different reservoir from a second hydraulic system.

It is another object of the invention to provide a hydraulic system which provides control of contaminates.

It is a further object of the invention to provide a system which provides for two separate hydraulic systems operated from a single mechanically driven motor.

It is a further object of the invention to provide a constantly running hydraulic system in conjunction with an intermittent hydraulic system.

It is a further object of the invention to provide a hydraulic system which is more safely and comfortably operated.

These and other objects of the invention may be more readily observed from the accompanying drawings and detailed description given below.

DETAILED DISCUSSION OF THE PREFERRED EMBODIMENT(S)

Figure 1:
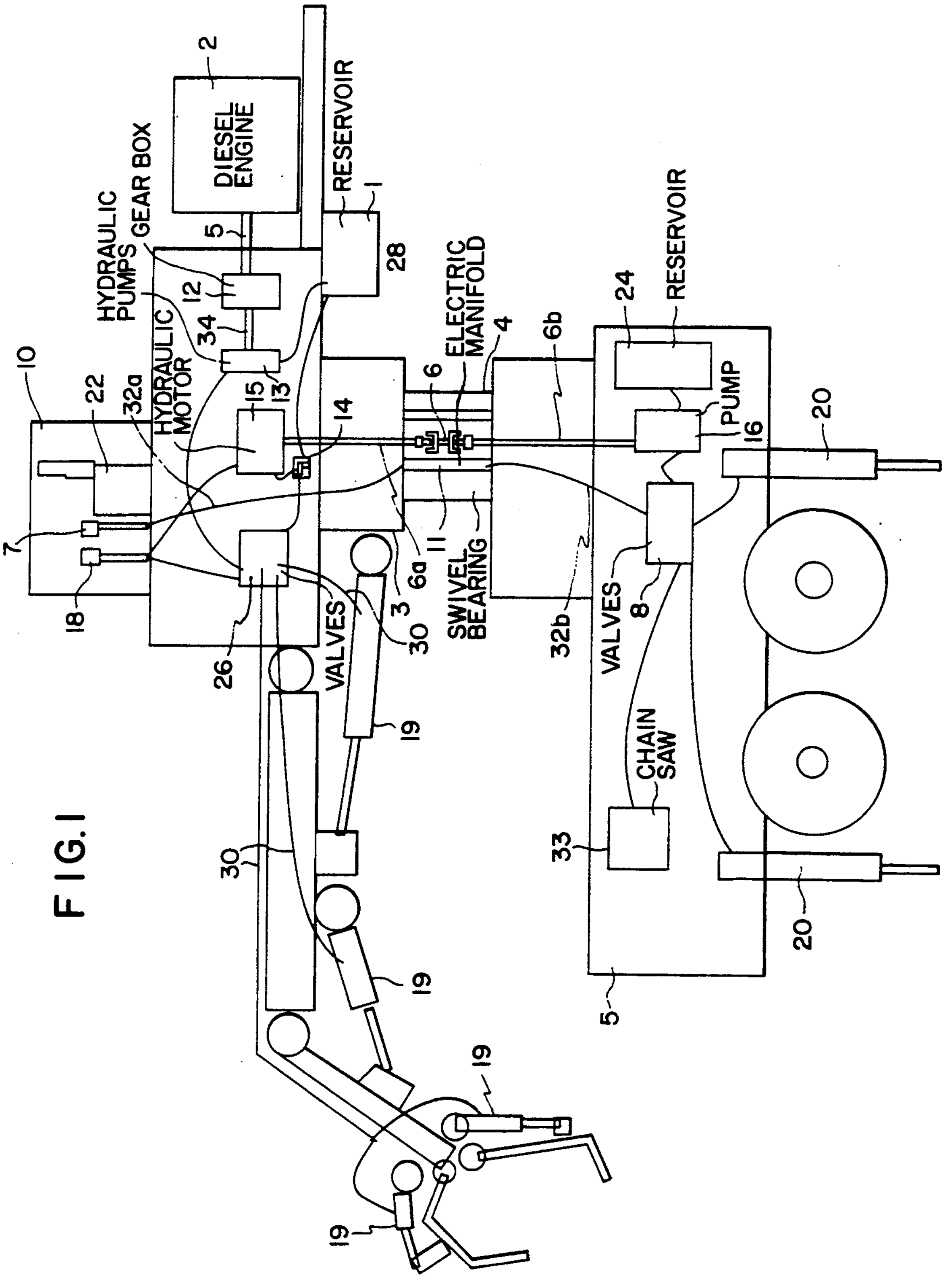
FIG. 1 is a block diagram showing the layout of the components in the preferred embodiment.
Figure 2A:
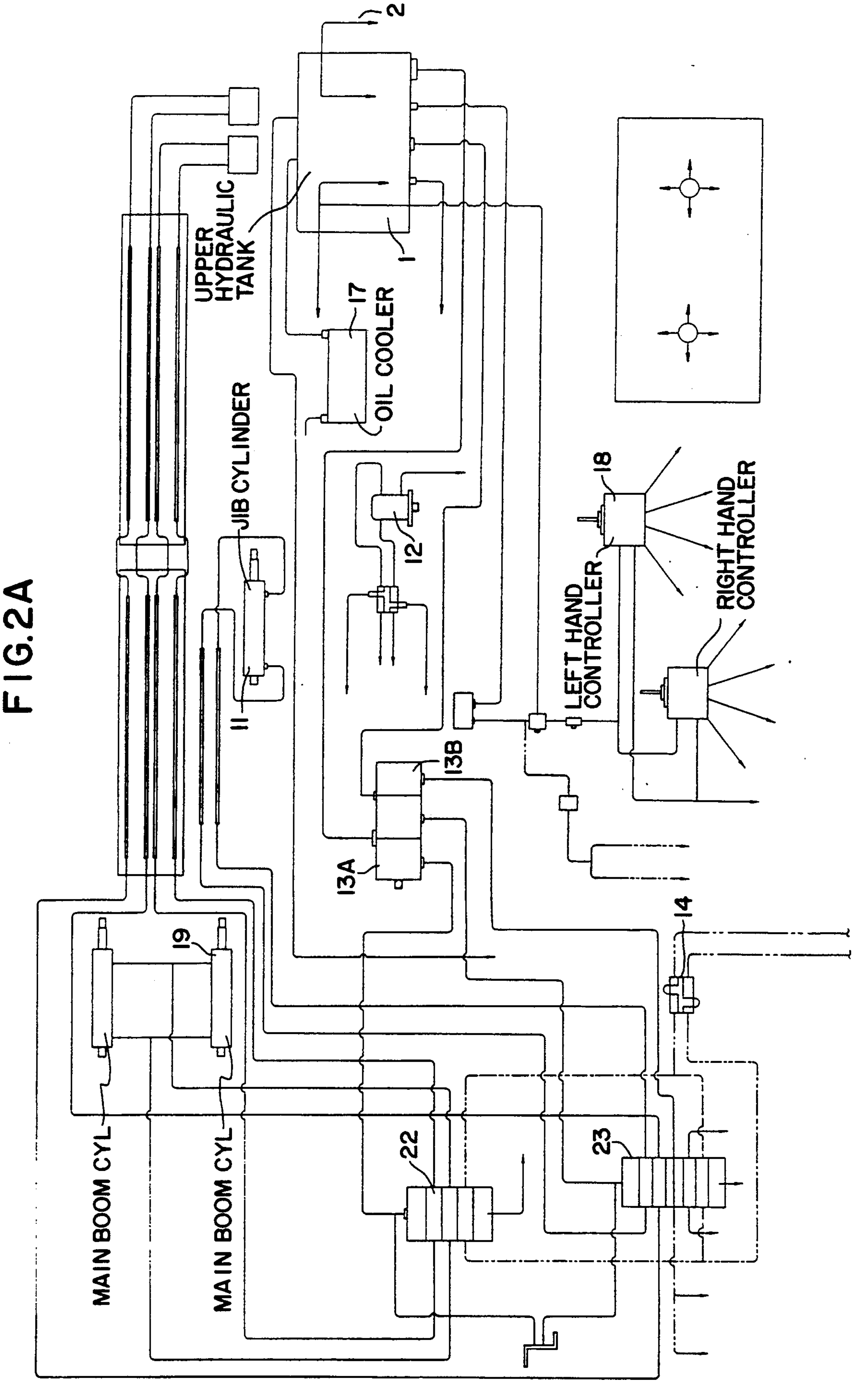
FIGS. 2A and 2B are a design layout of one hydraulic system envisioned in the preferred embodiment.
Figure 2B:
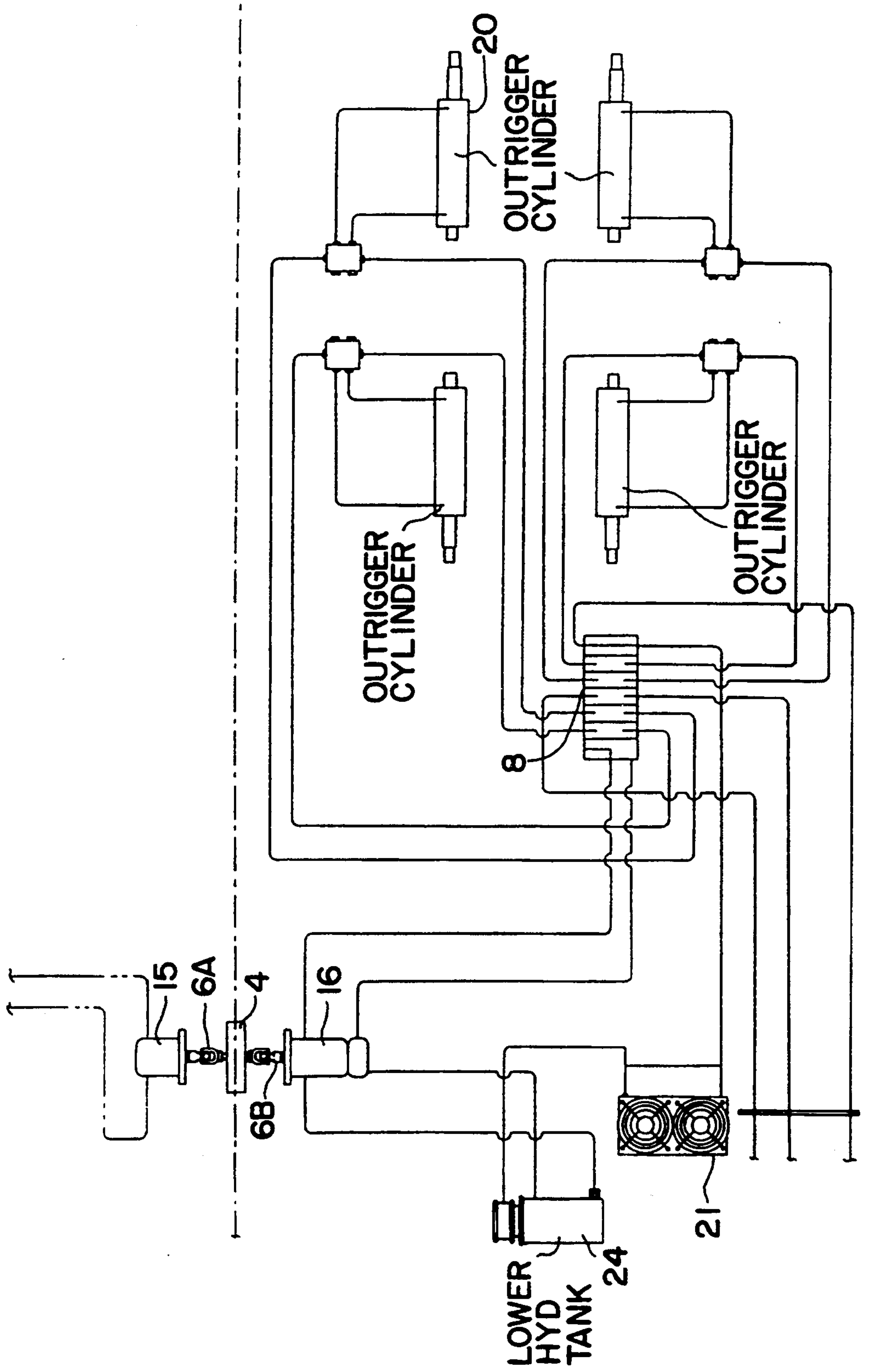

In the preferred embodiment of the invention which is shown in FIGS. 1, 2A and 2B it is envisioned that the first hydraulic system would have several hydraulic pumps 13 driven by a gasoline or diesel type engine 2 mounted on a revolving raised platform 3.

This revolving raised platform 3 would be connected by way of a swivel 4 to a lower platform 5.

The motor driven first hydraulic system would communicate with the second hydraulic system by way of a drive shaft 6 running through the center of the swivel 4. The swivel 4 is preferably a rotational bearing 4.

In order to allow for both hydraulic systems to be controlled in a single location electric switch as 7 runs each lower valve system 8 on the lower hydraulic system. This electrically activated valve system is in turn activated by a series of electric controls 7 on a single control platform 10 on the raised platform 3. The electrical signals pass by way of a electric manifold 11 communicating between the top system and the bottom system so that there is no concern about the twisting of wires even if the top system revolves several times relative to the bottom system.

One method, not shown is to have the diesel engine 2 run a standard series of gear boxes 12 wherein gear boxes 12 run the separate hydraulic pumps 13. In this embodiment one of those hydraulic pumps 13*a* could channel the hydraulic pressure directly to the hydraulic motor 15 which would run a drive shaft 6 which runs a pump 16 on the lower separate hydraulic system which is utilized only when the gear box actuating pump 13*a* is engaged.

The engine 2 runs one or more pumps 13 which in turn sends fluid to a series of valves 26. One valve 26 would go to a diverter 14 which would channel the fluid into or away from the motor 15. If fluid was directed into the motor 15, the drive shaft 6 would turn, running the lower system. If the fluid were diverted away from the motor 15, the fluid would cycle back to the reservoir 1 and would not do work.

For purposes of the preferred embodiment it is envisioned that one platform 3 is raised and rotatable relative to another platform 5.

Several methods are available for accomplishing the separation and actuation of two hydraulic systems which both utilize the same power drive system 2. The power drive system 2 is usually a diesel or gasoline type engine 2 mounted on the upper platform 3. Alternatively the use of electrical motors 2 or any other drive systems could be used without departing from the concept embodied herein.

The transfer system channeling hydraulic power or engine power to the mechanical power of a drive shaft 6 could be accomplished by changing power (from hydraulic motor 15 or the engine 2) to electrical power or any other form allowing transmission through a rotational axis as with an electrical manifold 11 without requiring a fluid exchange.

This arrangement of isolating one hydraulic system from the other allows for the two hydraulic systems to be run at different speeds and also does away with some of the danger to the complex filtering and cooling as shown with oil coolers 17, switch boxes 22 and 23 and controls 18, 19 shown in FIG. 2. This protects the upper hydraulic system from dirt and the failure of one of the multiple hydraulic pumps or actuators 20 and 21 in FIG. 2 which serve to make the remote system function. Hydraulic lines 30 connect the pistons 19 to the valves 26. Other lines 28 connect the pump 14 to the motor 15 and other lines 29 from the pumps to the valves 26. Feed lines 31 go from the reservoirs 1 and 24 to the pumps 14 and 16.

In the existing prior art the hydraulic system in the lower platform 5 was constantly active and the drive shaft 6 in a hydraulic swivel system was constantly in action.

Using the improvement shown in the present invention the lower hydraulic system may be totally inactivated until it is used by using a diverter 14 or by disconnecting the drive 2 by other methods as described in more detail below. Therefore any high heat generating systems in the lower platform have an opportunity to cool off while the upper platform systems which produce less heat and require less energy to operate, continue to be active.

This serves to minimize the amount of time that the moving parts on the lower platform operate and to minimize the time when the lower drive shaft is drawing energy.

In addition the present arrangement by providing for electrical switches 7 operating the lower hydraulic valves 8 switches 7 may be placed on or near the controls 18 for the upper hydraulic system for controlling the lower hydraulic system making the entire arrangement closer to the user at seat 22 and therefor easier to use without complex hydraulics running to valves and back from the lower hydraulic reservoir.

This is because upper hydraulic valves 26 typically require either a joy stick type control or a series of hydraulic levers opening and shutting the hydraulic valves. In the prior art a multiplicity of these hydraulic valves 26 were necessary. Using the electric switches 7 embodied herein a number of these hydraulic valves 26 can be eliminated and the controls which would otherwise operate those hydraulic systems can be mounted on top of the remaining hydraulic valves where the operator would control the system.

As shown in FIG. 1 the diesel engine 2 runs a standard gear box 12 by way of drive shaft 35 where gear box 12 runs pump shaft 34 which powers hydraulic pump 13. Multiple pumps 13 could be used to allow different fluids reservoirs to different units. One hydraulic pump 13*a* would channel the hydraulic fluid under pressure to either the hydraulic motor 15 which would run the lower hydraulic pump 13*a* or would otherwise go to power a drive shaft 6 which runs a pump 16 on the lower separate hydraulic system which is utilized only when the gear box actuating pump 13*a* is engaged.

The other system would utilize a diverter 14 which would channel the fluid into or away from the motor 15. If fluid was directed into the motor 15, the drive shaft would turn running the lower system. If the fluid were diverted away from the motor 15, the fluid would cycle but would not do work requiring less energy expended.

Other systems could have two separate types of hydraulic motors run by the diesel engine. One of these embodiments would be a hydraulic piston type system. The motor could be shut off merely by stopping the flow of hydraulic fluid into the pistons so that the piston continued to operate while the hydraulic system did not pass due to the shut off of hydraulic fluid to the piston cylinders.

With systems in the prior art the hydraulic reservoir for upper and lower hydraulics is behind or below the operator. Tremendous heat is generated in the hydraulic systems and much of the heat is kept in the lower system away from the operator utilizing this invention.

The lower hydraulic system may operating treads or wheels, a chain saw 33, and outriggers 20 to support the device during loading.

A typical hydraulic system utilizing the technology shown in the present invention is shown in FIG. 2. The motor 2 runs a series of pumps such as those shown at 17. One pump shown as 13 a draws fluid from the upper hydraulic tank reservoir 1 and sends this to the hydraulic motor 15. As can be seen, pump 13 a may send the fluid to several different elements and more than one pump may cooperate to send hydraulic fluid to run the motor 15.

As shown in FIGS. 2A and 2B, the motor 15 is connected by the upper half 6*a* of drive shaft 6 which passes between a rotational bearing 4.

The lower half 6*b* of drive shaft 6 then is connected to a pump 16 which draws hydraulic fluid from a second lower hydraulic tank 24. As can be seen, by inserting a diverter 14, the flow of fluid to the motor 15 can be stopped. In this way, the lower hydraulics are caused not to operate while the fluid is recycled through pump 13*a* saving energy and reducing the wear and tear on the lower hydraulic system.

A quick look at the set up of this typical system shows that the more complex hydraulics are those on the upper system. These hydraulics require an oil cooler 17, hand controls or levers 18, and controls and pistons to operate the rotational bearing 4 so that the upper platform can rotate. Several cylinders 19 operate jibs and booms and grapples.

The lower system, requiring only intermittent operation may require no cooling system, and has outrigger cylinders 20 which need only be set once when operation begins and saw cylinders 21 which only need to operate when cutting is taking place. As a result, the valve system 8 to the lower hydraulic system is operatable by electronic switches 7 and the more complicated mechanisms are eliminated. Also, the cleaning of the lower system is eased.

As can be seen in FIG. 1 power travels through wires 32*a* to the electric manifold 11 to wires 32*b* to control electric valves 8 which power the lower outriggers 20 and saw 33.

In a typical situation as shown in FIGS. 2A and 2B, the top platform would have a diesel engine 2 which would run three separate pumps 13. One would be a 55 gallon per minute pump operating the main boom the second would be a 45 gallon per minute jib boom and swing motors and the third would be a 30 gallon per minute would operate a motor to run the motor 15 turning the drive shaft 16.

This 30 rpm pump 13*a* would power motor 15 which would in turn drive a shaft 6 which would drive a lower platform pump 16 which would operate at 70 gallons per minute which would be sufficient to operate the single saw and outriggers which the invention is designed to accommodate.

The present system allows the hotter hydraulic fluid in the bottom system (reservoir 24) to be removed from the area around the operator seat 22. This not only makes the operator, sitting in chair 22, more comfortable by removing a heating system but also serves the purpose of adding safety since there is less possibility of a high pressure hydraulic leak affecting the operator.

The present invention allows for the separation of the more complicated hydraulic system, which also is a more expensive system, on top from the lower and less expensive hydraulic system in the bottom. A breakdown in the lower system does not affect the upper system and a better filtering system may be used for the upper system without burdening more expensive controls, cooling and filtering systems with the lower hydraulic system. Similarly, the plumbing which potentially can malfunction and spray hot hydraulic fluid under pressure is reduced.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

I claim:

1. A system for operating hydraulic equipment run by hydraulic fluid, comprising:

a first location positioned on a first elevation comprising:

a first motor generating first power;

a first pump connected to said first motor pumping first hydraulic fluid responsive to the first power generated by said first motor;

a first actuator performing a first action responsive to the first hydraulic fluid pumped by said first pump; and a second motor generating second power;

a swivel connected to said first location and including a drive shaft transferring the second power generated by said second motor in said first location; and a second location rotatably mounted on a second elevation different than the first elevation of the first location via said swivel and receiving the second power via said drive shaft, said second location comprising:

a second pump receiving the second power from said second motor via said drive shaft and pumping second hydraulic fluid responsive to the second power generated by said second motor; and a second actuator performing a second action responsive to the second hydraulic fluid pumped by said second pump, wherein said second motor in said first location selectively generates the second power transferred to said second pump in said second location producing periods of inactivity for said second pump.

2. The system of claim 1 wherein said first and seconds pumps include first and second supply means respectively for providing the first and second hydraulic fluid under pressure.

3. The system of claim 2 further comprising selection means for selectively transferring the first hydraulic fluid pumped by said first pump to said second motor for selectively driving said second motor.

4. The system of claim 3 wherein the selection means comprises a diverter for diverting the first hydraulic fluid to the second motor for driving said second motor.

5. The system of claim 2 wherein the first motor comprises an engine operating the first pump connected to the first supply means and providing the first hydraulic fluid under pressure to power the second motor.

6. The system of claim 3 wherein the selection means comprises gearbox means for selectively funneling the second power generated by said second motor to the second pump for directing flow of the second hydraulic fluid.

7. The system of claim 3 wherein the selection means comprises a piston supplied with the first hydraulic fluid and diverter means for stopping flow of the first hydraulic fluid to the piston stopping action of the piston and wherein the piston drives the second motor for generating the second power.

8. The system of claim 2, further comprising transfer means including a drive shaft driven by the first motor, and wherein the second supply means is driven by the drive shaft.

9. The system of claim 8 wherein the second supply means comprises a hydraulic pump driven by energy generated from the transfer means and pumping the second hydraulic fluid from a second hydraulic reservoir.

10. The system of claim 8 wherein the first motor provides electrical energy to the transfer means.

11. The system of claim 10 wherein the transfer means is a circuit allowing periodic transfer of the second power to the second supply means.

12. The system of claim 11 wherein the second supply means is an electric pump powered by electrical energy supplied by the transfer means for pumping the second hydraulic fluid from a second hydraulic reservoir to directly actuate equipment in the second location.

13. The system of claim 2 further comprising control means for controlling the second supply means.

14. The system of claim 1, wherein said first location further includes a first reservoir receiving the first hydraulic fluid pumped by said first pump, and wherein said second location further includes a second reservoir receiving the second hydraulic fluid pumped by said second pump, producing less heat experienced by a controller located at the first location.

15. The system of claim 1, wherein a failure experienced in said second location does not affect the operability of said first location.

16. A system for operating hydraulic equipment run by hydraulic fluid comprising:

a first location positioned on a first elevation and having an axis of rotation, comprising:

a first motor generating first power;

a first pump connected to said first motor pumping first hydraulic fluid responsive to the first power generated by said first motor; and a first actuator performing a first action responsive to the first hydraulic fluid pumped by said first pump;

transfer means for accepting the first hydraulic fluid from the first pump and for transferring the first hydraulic fluid as a transferable medium; and a second location rotatably mounted on a second elevation different than the first elevation of the first location via said swivel and receiving the transferrable medium via said transfer means, said second location comprising:

deconversion means for converting the transferable medium into second hydraulic fluid under pressure at the second location; and a second actuator performing a second action responsive to the second hydraulic fluid received from said deconversion means, wherein said transfer means selectively generates the transferrable medium transferred to said deconversion means in said second location producing periods of inactivity for said deconversion means.

17. The system of claim 16 wherein the transfer means further comprises conversion means for converting the first hydraulic fluid into a transferable medium of one of mechanical and electrical quality not requiring one of plumbing and gaskets for transfer.

18. The system of claim 16 further comprising selection means for selectively applying the first power generated by the first motor to the first pump.

19. The system of claim 17 further comprising selection means for applying the first hydraulic fluid driven by the first pump to the conversion means for converting the first hydraulic fluid into the transferable medium of one of mechanical and electrical quality not requiring one of plumbing and gaskets for transfer.

20. The system of claim 17 further comprising selection means for applying the transferable medium to the deconversion means.

21. The system of claim 16 wherein the deconversion means comprises a second pump driven by the transfer means cooperating with a second hydraulic source so that the second pump supplies the second hydraulic fluid under pressure when the second pump is in operation.

22. The system of claim 17 wherein the conversion means comprises a hydraulic motor driven by the first pump and wherein the transfer means further comprises a drive shaft driven by the hydraulic motor passing through a center of rotation of the first location.

23. The system of claim 22 wherein the deconversion means comprises a second pump means driven by the drive shaft connected to a second source of hydraulic fluid so that the second pump means may supply the second hydraulic fluid under pressure when the second pump means is in operation.

24. The system of claim 23 further comprising selection means for selectively supplying the first hydraulic fluid to the second pump means for controlling the second pump means, and wherein the selection means comprises a valve electrically controlled by a switch located at the first location and connected to the second location by way of an electrical manifold.

* * * * *